Dec. 4, 1923.

T. J. BRADY 1,476,585

AUXILIARY CLUTCH PEDAL CONTROL

Filed Feb. 20, 1922  2 Sheets-Sheet 1

INVENTOR
Thomas J. Brady
BY HIS ATTORNEY
Ernest C. Rood

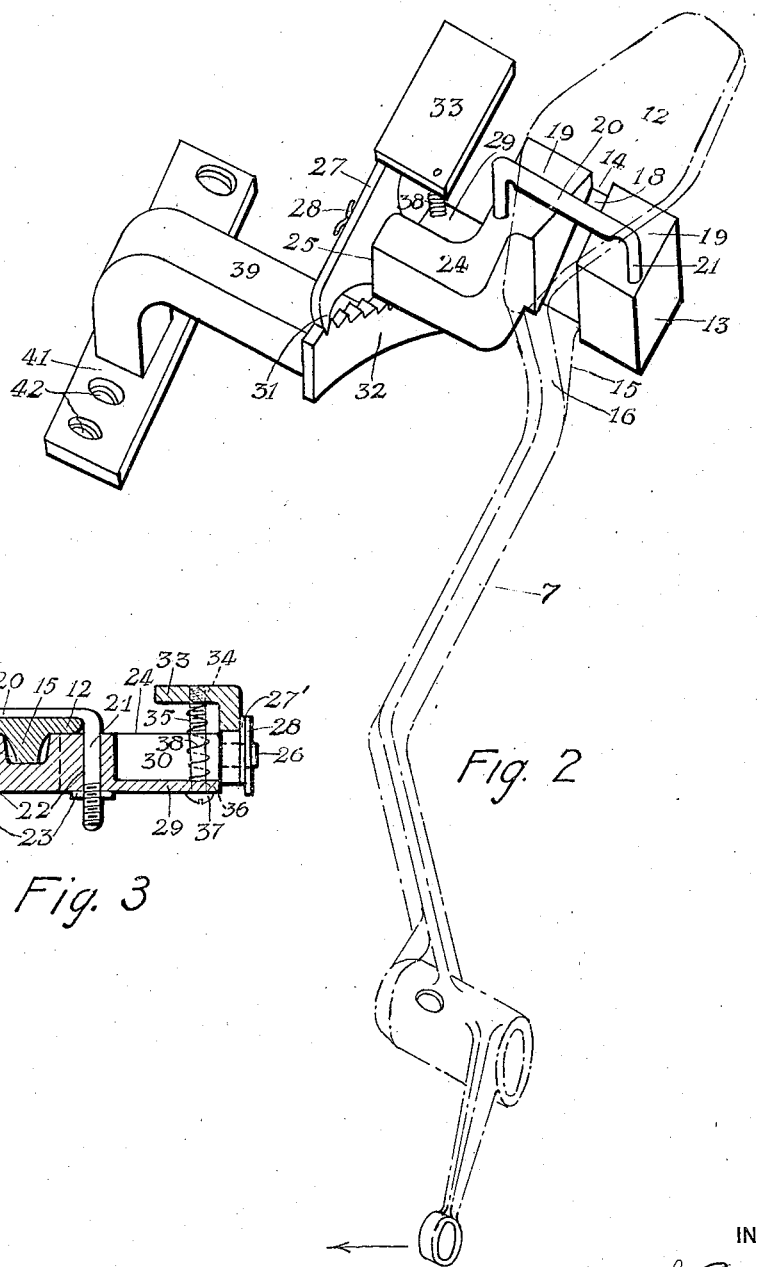

Patented Dec. 4, 1923.

1,476,585

UNITED STATES PATENT OFFICE.

THOMAS J. BRADY, OF ASTORIA, NEW YORK.

AUXILIARY-CLUTCH-PEDAL CONTROL.

Application filed February 20, 1922. Serial No. 537,742.

*To all whom it may concern:*

Be it known that I, THOMAS J. BRADY, a citizen of the United States, and a resident of Astoria, in the county of Queens and State of New York, have invented new and useful Improvements in Auxiliary-Clutch-Pedal Controls, of which the following is a specification.

My invention relates to auxiliary clutches for motor vehicles, the invention being more particularly related to a clutch pedal control, designed especially for use in connection with the type of clutch pedal mechanism employed on Ford automobiles, trucks and the like.

It is well known that in driving Ford vehicles on congested thoroughfares, over impaired roads, up inclines, and under various other conditions, a considerable strain is imposed on the muscles of the leg and foot because of the frequent necessity of holding the clutch pedal, against the urge of its retractile spring, in neutral position or in low speed position. This strain particularly when long continued, results in the muscles becoming sore, cramped and otherwise afflicted. When driving on high gear, this condition need not be present, for the foot may be removed from the clutch pedal.

The main object, therefore, of the present invention is to provide a control through the agency of which the clutch pedal will be automatically held either in neutral or in low speed position, accordingly as it is depressed, so that the foot may be removed and the muscles relaxed, the parts being so constructed and arranged that the auxiliary clutch can be readily and instantly tripped by the foot thereby allowing the clutch pedal to come all the way back or into high speed position whenever desired.

My invention has for a further object to provide a simple and reliable device of this character, which is inexpensive to manufacture and the construction of which is such that it may be readily used in connection with the standard clutch pedals of the Ford vehicles; but it will be understood that my device may be applied to other makes of motor cars or structures wherever the same is applicable for such use.

To these ends my invention comprises the novel features hereinafter set forth with reference to the accompanying drawings, and more particularly pointed out in the annexed claims.

In the drawings:

Fig. 2 is an isometric view of my device in connection with a clutch pedal, shown in broken lines.

Fig. 3 is a vertical sectional view through the auxiliary clutch parts as applied to a clutch pedal.

Figure 1:
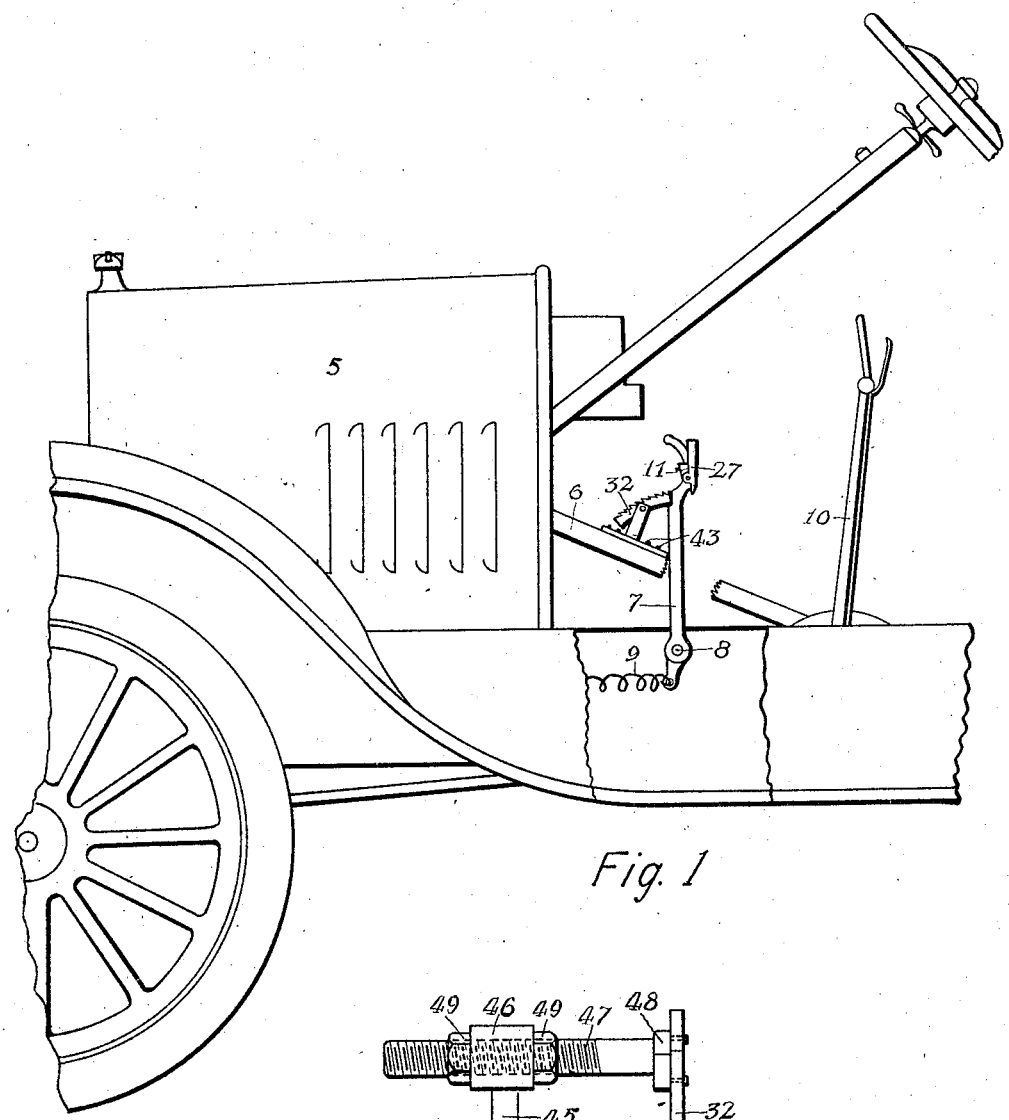
Fig. 1 is a fragmentary view of a Ford car, showing the application thereto of my device.

With more particular reference to the accompanying drawings, the numeral 5 indicates in general a fragment of a common type of Ford car, and of the standard parts of this car which appear necessary to illustrate the application of my invention, 6 indicates a rigid sill upwardly inclined towards the instrument board, the top surface of this sill being exposed and lying flush with the foot boards. 7 represents a standard clutch pedal, fast on the axis 8 and constantly urged into its rearward position by the retractile spring 9. 10 is the customary hand lever.

In carrying out my invention, I provide a body member or casting indicated generally at 11 and one portion of which is so formed as to fit snugly on the underside of the pedal portion 12. To this end, this body member, spacedly from the end 13, is made with a cross recess 14 suitable for the reception of the web 15 which extends along the underside of the neck portion 16 and pedal portion 12 of the clutch pedal, it being noted that the bottom 18 of the cross recess inclines upwardly to conform snugly with the shape of said web 15 and that on either side of the cross recess the top surfaces 19 of the body member fit intimately on the underside of the pedal portion 12. The body member 11 is held securely to the clutch pedal by means of an inverted U-shaped member 20, which engages over the pedal portion 12 and the legs 21 whereof extend downwardly through openings 22 in the body member and are threaded to receive the securing nuts 23.

The body member is further formed with a rearwardly offset portion 24, into the outer flat end 25 of which is tapped a pivot stud 26, on which is pivotally mounted an auxiliary clutch 27, held thereon in operative position by a washer 27' and a cotter pin or key 28. The body member is also formed on its bottom side in advance of the offset portion 24 with a ledge extension 29 so as to provide a deep recess 30 open at one end and on the forward side.

At its rear end the auxiliary clutch 27 is made with a clutch-point 31, designed to cooperate with a curved rack 32, and along its forward portion it is cast or otherwise provided with a toe-plate or lateral extension 33 that projects over the ledge extension 29, having space for movement in the recess 30. Threaded into the toe-plate at 34 is a screw 35 which extends downwardly and through an opening 36 in the ledge extension 29, where its head 37 serves as a stop to limit the movement upwardly of the toe-plate from the ledge. Encircling the screw 35 and confined between the toe-plate and the ledge is a coiled spring 38 which normally holds the auxiliary clutch in position for operative engagement with the curved rack 32, these parts being so arranged and proportioned that when the auxiliary clutch is engaged with the rack, the toe-plate will come above the level of the pedal portion 12, where the driver can readily depress it and disengage the clutch point from the rack without removing his foot from the clutch pedal.

As clearly shown in the drawings, the curved rack is supported in a plane parallel to the radial throw of the clutch pedal and directly in the path of operation of the clutch point. More specifically, in location and in extent of reach, the curved rack preferably is co-incident with those positions of the clutch pedal which are commonly referred to as neutral position and low speed position. For the support of the curved rack, I may provide an angular bracket 39 to which the curved rack is secured by riveting or otherwise, the said bracket being cast with a longitudinal base plate 41, provided with apertures 42 for the reception of screws 43 or equivalent means, whereby to be secured upon the sill 6 or some other fixed part.

Figure 4:
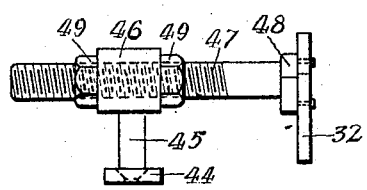
Fig. 4 is an end elevation of an adjustable bracket with its curved rack.

As shown in Fig. 4, I may provide for the support of the curved rack, an adjustable bracket consisting of a base plate 44, adapted as in the previous instance to be secured to the sill or other fixed part, an upright shank 45, and a hollow cross head 46, which is interiorly threaded to receive a threaded pin 47, formed at one end with a head 48, to which the curved rack is riveted or otherwise secured. To secure the pin in the adjusted position desired, lock-nuts as 49 are screwed home on the pin against the opposite ends of the cross head. Obviously, the purpose of this adjustable bracket is to make provision for any difference in distance that may be found in different cars, between the sill or other fixed support and the exact position in which the curved rack must be held in order to come in the path of the auxiliary clutch.

It shoud be observed that the teeth of the curved rack 32 are inclined forwardly so that the point of the auxiliary clutch, under the yielding of the spring 38, will slide thereover when the clutch pedal is pressed forwardly, and will also hold the clutch pedal against movement in any position it is placed in the neutral or in the low speed zone. To allow the clutch pedal to move reversely or towards or into high speed position, it is only necessary for the driver to trip the auxiliary clutch by depressing the toe-plate with the toe of his shoe.

Having thus described my invention, what I claim is:

1. In a clutch pedal control, a body member adapted to fit the pedal portion of a clutch pedal and means for securing the same thereto, said body member having an offset portion and a ledge extending forwardly thereof to provide a recess, a pawl pivotally engaged with said offset portion and formed at one end with a toe-plate adapted to work in said recess, and means in connection with said ledge and said toe-plate whereby yieldingly to maintain the toe-plate in a level higher than the surface of the pedal portion of the clutch pedal.

2. An automobile clutch pedal control including, in combination, a body member made to have intimate fit on the underside of the pedal portion of the clutch pedal and having a rearwardly offset portion at one side of said pedal portion, means for rigidly bolting said body member to said pedal portion, a pawl pivoted to the outer end of said offset portion and having at its forward end a toe-plate adapted for movement in front of said offset portion, a curved rack device having adjustable support to come in the path of operation of the pawl, and yielding means for normally holding the pawl in position for engagement with said rack device.

3. In combination with a clutch pedal, a body member and means for securing the same to the underside of the clutch pedal, a spring urged pawl pivoted to the body member and adapted to operate independently and including a toe-plate whereby to be tripped, a bracket, and a curved rack device having means adjustable in said bracket so as to be positioned in the path of operation of the pawl whereby to be engaged for holding the clutch pedal in any desired position of depression.

4. In combination with an automobile having a spring retracted clutch pedal, a body member carried by the clutch pedal for movement therewith, a pawl pivoted to the body member and including a toe-plate at one end and a point at the other end, a curved rack device supported on the automobile in position to come in the path of operation of the pawl point, and means in connection with the body member and the pawl for normally holding the pawl point in position to engage the rack device and with the toe-plate elevated in position to be tripped for the disengagement of the pawl point from the rack device.

In testimony whereof I have signed my name to this specification.

THOMAS J. BRADY.